(12) United States Patent
Barendregt

(10) Patent No.: US 9,234,556 B1
(45) Date of Patent: Jan. 12, 2016

(54) ELASTOMER HAVING TEAR REDUCING CONTOURED EDGES

(71) Applicant: Alan Carl Barendregt, Austin, TX (US)

(72) Inventor: Alan Carl Barendregt, Austin, TX (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/473,469

(22) Filed: Aug. 29, 2014

(51) Int. Cl.
*F16F 1/36* (2006.01)
*F16F 1/373* (2006.01)
*B64C 27/51* (2006.01)
*F16F 15/08* (2006.01)
*F16F 1/40* (2006.01)

(52) U.S. Cl.
CPC .................. *F16F 1/373* (2013.01); *B64C 27/51* (2013.01); *F16F 1/36* (2013.01); *F16F 1/406* (2013.01); *F16F 15/08* (2013.01)

(58) Field of Classification Search
CPC ............. F16F 1/371; F16F 1/373; F16F 1/40; F16F 1/406; F16F 1/36; F16F 15/08; B64C 27/51; B64C 27/001
See application file for complete search history.

(56) References Cited

U.S. PATENT DOCUMENTS

| | | | | |
|---|---|---|---|---|
| 3,134,585 | A * | 5/1964 | Trask | F16F 1/40 188/268 |
| 3,758,230 | A * | 9/1973 | Potter | B64C 27/51 416/107 |
| 3,842,945 | A | 10/1974 | Potter | |
| 4,097,193 | A | 6/1978 | Brunsch | |
| 4,886,419 | A | 12/1989 | McCafferty | |
| 5,186,686 | A | 2/1993 | Staples | |
| 5,407,325 | A * | 4/1995 | Aubry | B64C 27/51 416/106 |
| 5,562,416 | A | 10/1996 | Schmaling | |
| 6,659,438 | B2 * | 12/2003 | Michael | F16F 1/406 267/153 |
| 8,123,483 | B2 | 2/2012 | Beroul | |
| 8,167,561 | B2 | 5/2012 | Jones | |
| 9,004,512 | B2 * | 4/2015 | Noble | B60G 11/24 280/124.116 |
| 2002/0154940 | A1 * | 10/2002 | Certain | B64C 27/51 403/24 |
| 2007/0145654 | A1 * | 6/2007 | Wietharn | B60G 11/22 267/141.1 |
| 2010/0007069 | A1 * | 1/2010 | Kawada | F16F 1/406 267/140.3 |

FOREIGN PATENT DOCUMENTS

| | | | | |
|---|---|---|---|---|
| DE | 1155158 B | * | 10/1963 | ............... F16F 1/40 |
| DE | EP 1686282 A1 | * | 8/2006 | ............ F16F 1/3821 |
| GB | FR 2101402 A5 | * | 3/1972 | ............. B61F 5/305 |

* cited by examiner

*Primary Examiner* — Anna Momper
(74) *Attorney, Agent, or Firm* — Mark Ussai; SKF USA Inc. Patent Dept.

(57) ABSTRACT

An elastomer damper including an elastomeric member laminated between two rigid plates. The elastomeric member having a first elastomer mating surface, a second elastomer mating surface, and a peripheral edge extending between each of the elastomer mating surfaces. Each elastomer mating surface is coupled to a respective rigid plate. At least a section of the peripheral surface is formed comprising a concave arch formed comprising one of a quarter ellipse or a dual quarter ellipse. The concave arch extends substantially between the elastomer mating surfaces. The concave arch shape reduces tearing of the elastomer damper. The dual quarter ellipse is formed by combining a first elongated first quarter ellipse and a second elongated first quarter ellipse in a continuous concave arched shape.

20 Claims, 6 Drawing Sheets

ELASTOMER HAVING TEAR REDUCING CONTOURED EDGES

FIELD OF THE INVENTION

The present invention relates to a contour of an exposed edge of an elastomer to reduce tearing. More specifically, the contour of the exposed edge is designed having a quarter elliptical shape or a pair of quarter elliptical shapes.

BACKGROUND OF THE INVENTION

Discussion of the Related Art

Machines are commonly assembled having one or more moving components. The moving components tend to have imbalances, which introduce a vibration of varying degrees into the system. The vibrations can cause unwarranted stresses upon the system resulting in premature failure. The components of the machine also subjected to various stresses and strains as a result of acceleration and de-acceleration of the various moving components, inertial forces, and the like. Pliant elements, such as shock absorbers, dampers, and the like are commonly integrated into the design of the machine's to accommodate any shock, vibration, imbalance, or other unwanted motions. The shock absorbers, dampers, and the like can also be employed to reduce transfer a transfer rate of abruptly generated forces to reduce stresses and/or strains placed upon other components of the machine.

One such solution is a damper. Dampers are offered in a multitude of designs. One offers damper is an elastomeric damper, which laminates an elastomer sandwiched between two sheets of rigid material. The elastomeric dampers are designed to control vibration and impact to reduce noise and absorb energy. The elastomeric damper is commonly integrated along a connection provided between two components. The pliancy of the elastomer reduces a transfer of acceleration between an applied force and a transferred force.

The elastomer is sandwiched between two generally parallel plates. The elastomeric damper is subjected to a variety of forces. The elastomer is subjected to shear, compression, and tension as a result of the various forces. The peripheral edge of the elastomer is unsupported enabling the pliancy of the elastomer to change the shape of the elastomer in accordance with the applied forces. The current design of the exposed surfaces of the peripheral edge is susceptible to tearing. The tearing significantly reduces the longevity of the elastomer; increasing the risk of simple or catastrophic failure.

Thus, what is desired is an elastomer that is designed to be more resilient against tearing resulting from subjection to shear, compression, and tension.

SUMMARY OF THE INVENTION

The present invention is directed towards an elastomer design to reduce tearing during use.

A first aspect of the present invention introduces an elastomeric damper comprising:
 a first damper plate having a first damper plate elastomer contacting surface and;
 a second damper plate being oriented generally parallel to the first damper plate;
 an elastomer element having a first damper plate engaging surface, an opposite second damper plate engaging surface and a peripheral surface extending between a circumferential edge of the first damper plate engaging surface and a circumferential edge of the second damper plate engaging surface, wherein at least a section of the peripheral surface is formed comprising a concave arch formed in a quarter ellipse;
 wherein the elastomer is assembled mating the first damper plate engaging surface with a surface of the first damper plate and the opposite second damper plate engaging surface with a surface of the second damper plate.

In a second aspect of the present invention, the concave arch formed as a dual quarter ellipse.

In another aspect of the present invention, the concave arch formed as a dual quarter ellipse comprises a pair of quarter ellipse-shaped surfaces, wherein a first quarter ellipse-shaped surface of the pair of quarter ellipse-shaped surfaces has a first lateral dimension and a second quarter ellipse-shaped surface of the pair of quarter ellipse-shaped surfaces has a second lateral dimension, wherein the first lateral dimension is greater than the second lateral dimension.

In yet another aspect of the present invention, the concave arch formed as a dual quarter ellipse comprises a pair of quarter ellipse-shaped surfaces, wherein the pair of quarter ellipse-shaped surfaces forms a continuously arched surface.

In yet another aspect, the elastomer further comprises a short edge thickness extending between a distal end of the quarter ellipse and the proximate damper plate elastomer contacting surface.

In yet another aspect, the short edge thickness is defined by a linear surface extending in a substantially lateral direction.

In yet another aspect, each of the pair of quarter ellipse-shaped surfaces are defined by an origin, wherein the first quarter ellipse-shaped surface of the pair of quarter ellipse-shaped surfaces is associated with a first quarter ellipse radial origin and a second quarter ellipse-shaped surface of the pair of quarter ellipse-shaped surfaces is associated with a second quarter ellipse radial origin.

In yet another aspect, the first quarter ellipse radial origin and the second quarter ellipse radial origin are separated by a first origin and second origin span (L1).

In yet another aspect, the elastomer is segmented into a first segment and a second segment, wherein the first segment is sandwiched between a first damper plate and an opposing surface of a centrally located force distribution plate and the second segment is sandwiched between an opposing surface of the centrally located force distribution plate and the second damper plate.

In yet another aspect, the elastomer is designed including a concave arched surface defined by the pair of quarter ellipse-shaped surfaces located at a first end extending between opposing damper plate surfaces and a concave arched surface defined by the single quarter ellipse-shaped surface located at a second end extending between opposing damper plate surfaces.

In yet another aspect, a multi-layer elastomer is formed having a first elastomer segment and a second elastomer segment, each of the first elastomer segment and the second elastomer segment having at least one of:
 a concave arched surface defined by the pair of quarter ellipse-shaped surfaces located at an end, the concave arched surface extending between opposing damper plate surfaces and
 a concave arched surface defined by the single quarter ellipse-shaped surface located an end, the concave arched surface extending between opposing damper plate surfaces.

In yet another aspect, the first elastomer segment and a second elastomer segment are mirror images of one another.

In yet another aspect, the first elastomer segment and a second elastomer segment are mirror images of one another, being mirrored about a central longitudinal axis of the multi-layer elastomer.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF REPRESENTATIVE EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
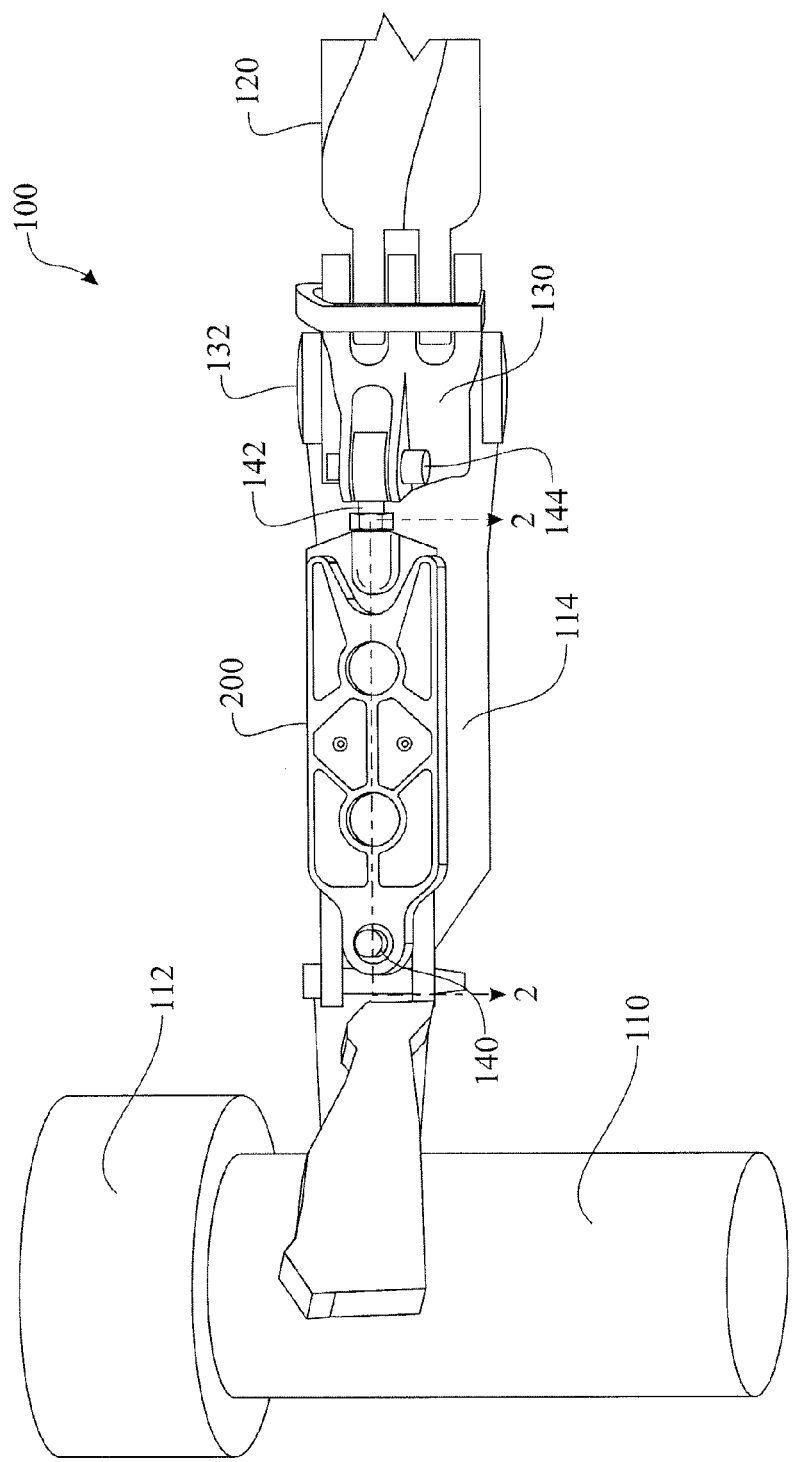
FIG. 1 presents an isometric elevation view of an exemplary partial assembly of a helicopter rotor assembly, wherein the exemplary illustration introduces one exemplary utilization of an elastomer damper.

A helicopter rotor assembly section 100, as illustrated in FIG. 1, introduces one exemplary implementation of an elastomeric damper 200. The helicopter rotor assembly section 100 comprises components typical of any helicopter rotor assembly, including a helicopter rotor Jesus nut 112 secured to an upper free end of a helicopter rotor mast 110. A helicopter blade assembly blade grip 130 is carried by a free end of a rotor hub 114 and assembled thereto by a helicopter blade retention element 132. A helicopter blade 120 is assembled to and supported by the helicopter blade assembly blade grip 130. The rotor hub 114 is supported and rotationally driven by the helicopter rotor mast 110. These and additional components provide rotational motion and support of a series of balanced helicopter blades 120. Additional components control a pitch and other operational functions of each helicopter blade 120.

The elastomeric damper 200 is installed along the rotor hub 114 to provide dampening and other functions into the helicopter rotor assembly section 100. The exemplary elastomeric damper 200 is assembled to a proximal end of the rotor hub 114 by a fixed damper mounting pin 140, as the proximal end of the rotor hub 114 remains at a fixed pitch. The exemplary elastomeric damper 200 is assembled to a distal end of the rotor hub 114 by an axial damper mounting rod 142, as the distal end of the rotor hub 114 is subjected to a changing pitch. The axial damper mounting rod 142 is pivotally coupled to the helicopter blade assembly blade grip 130 by an axial damper mounting rod coupling pin 144. This attachment configuration enables flexure between the helicopter blade assembly blade grip 130, the rotor hub 114, and the elastomeric damper 200.

Figure 2:
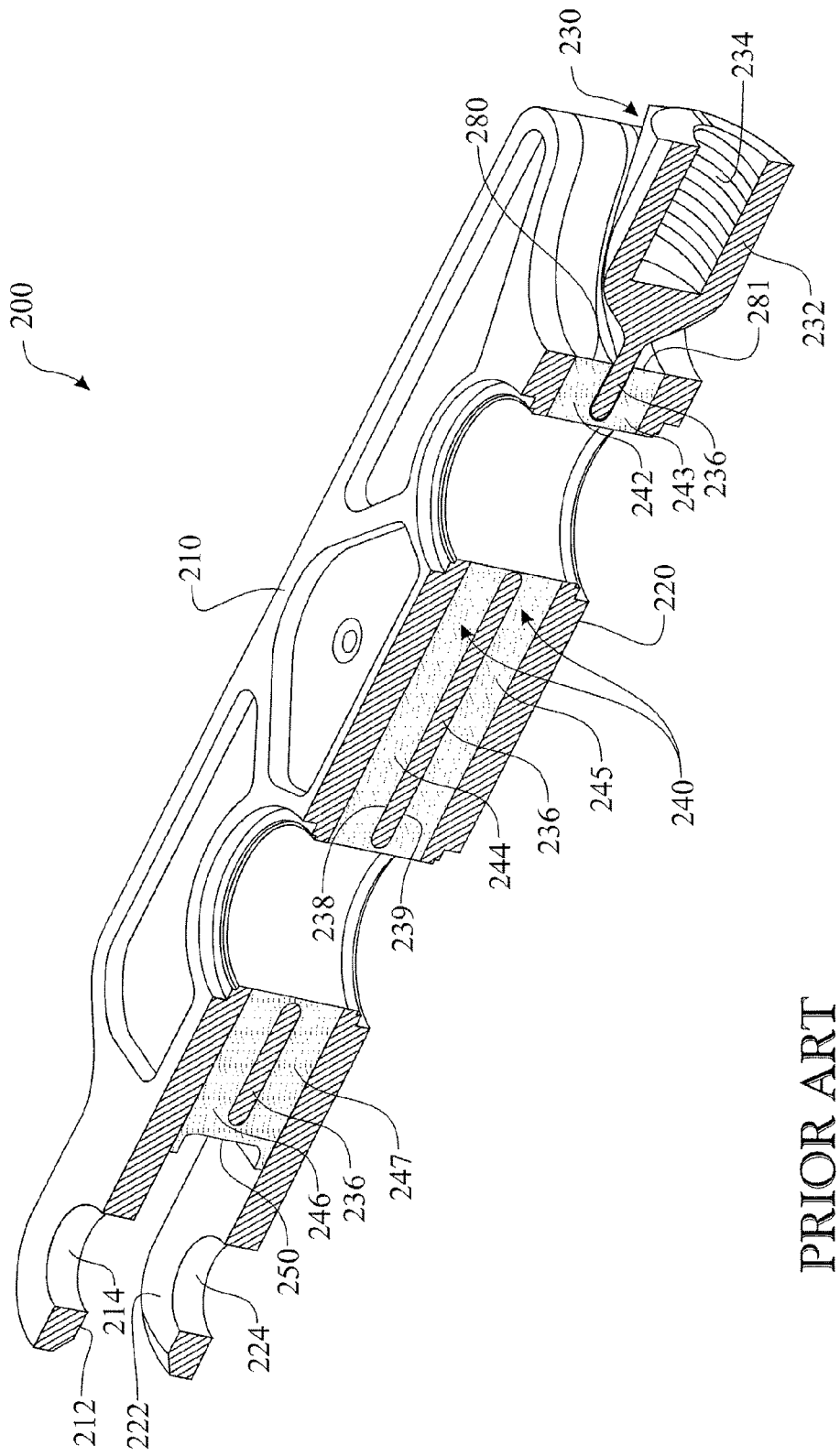
FIG. 2 presents an isometric sectioned view of the exemplary elastomer damper in accordance with the prior art, the section being taken along section line 2-2 of FIG. 1.
Figure 3:
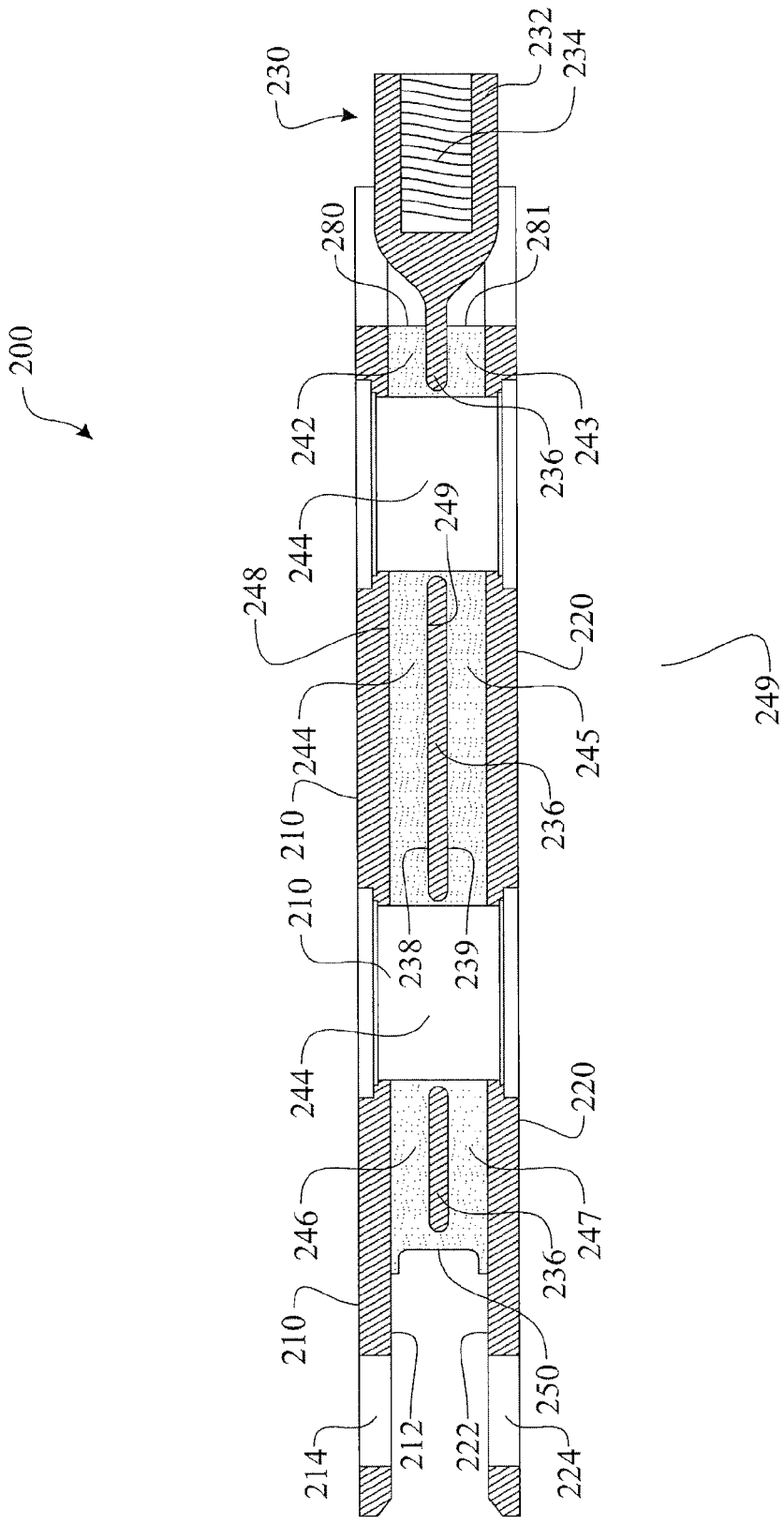
FIG. 3 presents an elevation sectioned side view of the exemplary elastomer damper in accordance with the prior art, the section being taken along section line 2-2 of FIG. 1.

Details of the elastomeric damper 200 are presented in section views presented in FIGS. 2 and 3. The elastomeric damper 200 is fabricated having an elastomeric member 240 laminated between a first damper plate 210 and a second damper plate 220. A mounting rod force distribution member 230 is centrally located within the elastomeric member 240. The mounting rod force distribution member 230 segments the elastomeric member 240 into a first or upper segment 242, 244, 246 and a second or lower segment 243, 245, 247. A first outer surface 248 of the elastomeric member 240, more specifically each upper segment 242, 244, 246, includes a first elastomer rigid plate mating surface 248, which is arranged contacting a mating first damper plate elastomer contacting surface 212 of the first damper plate 210. A second or intermediary elastomer rigid plate mating surface 249 of each upper segment 242, 244, 246 is arranged contacting the force distribution plate first elastomer contacting surface 238 located opposing the first damper plate elastomer contacting surface 212. Similarly, a second outer surface of the elastomeric member 240, more specifically each lower segment 243, 245, 247, is arranged contacting a mating second damper plate elastomer contacting surface 222 of the second damper plate 220. A second or intermediary surface of each lower segment 243, 245, 247 is arranged contacting the force distribution plate second elastomer contacting surface 239 located opposing the second damper plate elastomer contacting surface 222. The contacting surfaces can be simply contacting one another, providing a frictional interface between the two mating surfaces, bonded to one another using any suitable bonding agent, or mechanically retained such as by including a series of pins and mating receptacles.

The first damper plate 210 and second damper plate 220 are coupled to the rotor hub 114 by sliding each plate fixed damper mounting pin receiving aperture 214, 224 over the fixed damper mounting pin 140. Other assembly elements, such as assembly cylinders inserted through each of the pair of cylindrical passageways 216, 218 shown in FIGS. 2 and 3, retain the first damper plate 210 and second damper plate 220 fixed to one another. A fixing element (such as a nut, a securing pin, and the like) is assembled to the fixed damper mounting pin 140, securing the elastomeric damper 200 in location. The mounting rod force distribution member 230 includes a mounting rod coupling section 232 formed at an attachment end of a mounting rod force distribution member backbone plate 236. The mounting rod coupling section 232 includes a mounting rod coupling threaded receptacle 234 for threaded assembly to the axial damper mounting rod 142. The mounting rod force distribution member 230 is flexibly assembled to the damper plates 210, 220 by the elastomeric member 240. The flexible assembly between the mounting rod force distribution member 230 and the damper plates 210, 220 provides a dampening function. Adversely, the flexible application applied to the elastomeric member 240 induces a multitude of quality degrading structural characteristics onto the elastomeric member 240. These include a shear direction 402 and a compression/tension direction 404, as defined by FIGS. 5 and 6. Over time, the continued repeated subjection to a shear 402 and a compression/tension 404 causes degradation of the elastomeric member 240. One known failure is tearing of the elastomeric member 240 at the elastomer pinned end peripheral surface 250 and/or the elastomer rod end peripheral first segment surface 280, 281. The current geometry at each location 250, 280, 281 is either linear, linear edge with a flange located along each contact surface, wherein the linear edge and the flange are joined by a transition region having a small radius therebetween. These linear intermediary surface segments are subjected to a significant amount of shear. In the exemplary embodiment, the first damper plate 210 and second damper plate 220 remain stable respective to one another. The mounting rod force distribution member 230 moves longitudinally (parallel to an elongated axis of the elastomeric damper 200) and introduces a lateral, torsional force, pivoting along a plane defined by the elongated axis of the elastomeric damper 200. Additionally, the mounting rod force distribution member 230 can introduce a twist, or a torsional force rotating about the elongated axis of the elastomeric damper 200. It is noted that the motion of the mounting rod force distribution member 230 is greater than the motion of the damper plates 210, 220. The difference in displacement is provided by shear, compression, and tension applied to the segments of the elastomeric member 240. The elastomeric member 240 is susceptible to tearing at points of high concentration of the stress and strain. The stress is concentrated along each exposed peripheral edge 250, 280, 281. More specifically, the tearing originates along each exposed peripheral edge 250, 280, 281.

Figure 4:
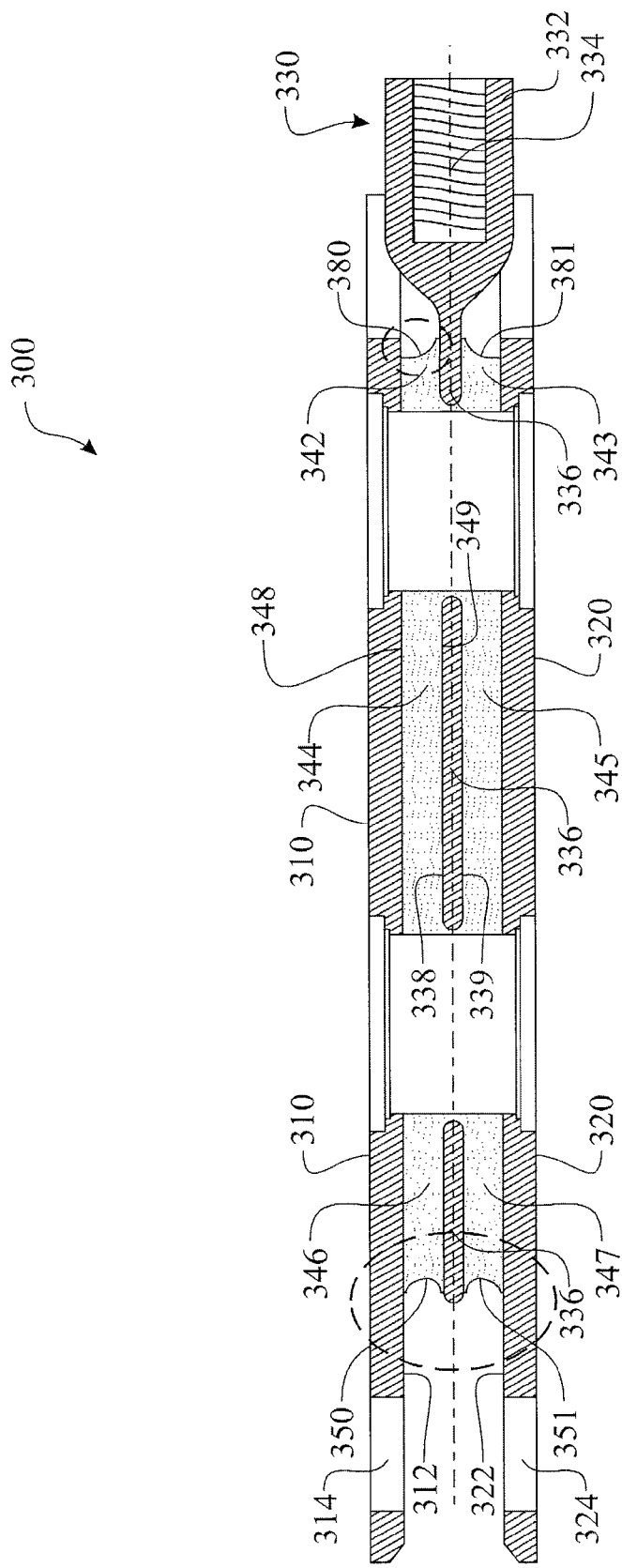
FIG. 4 presents an elevation sectioned side view of the exemplary enhanced elastomer damper in accordance with the present invention, the section being similar to the prior art shown in FIG. 3 to clearly distinguish the present invention over the prior art.
Figure 5:
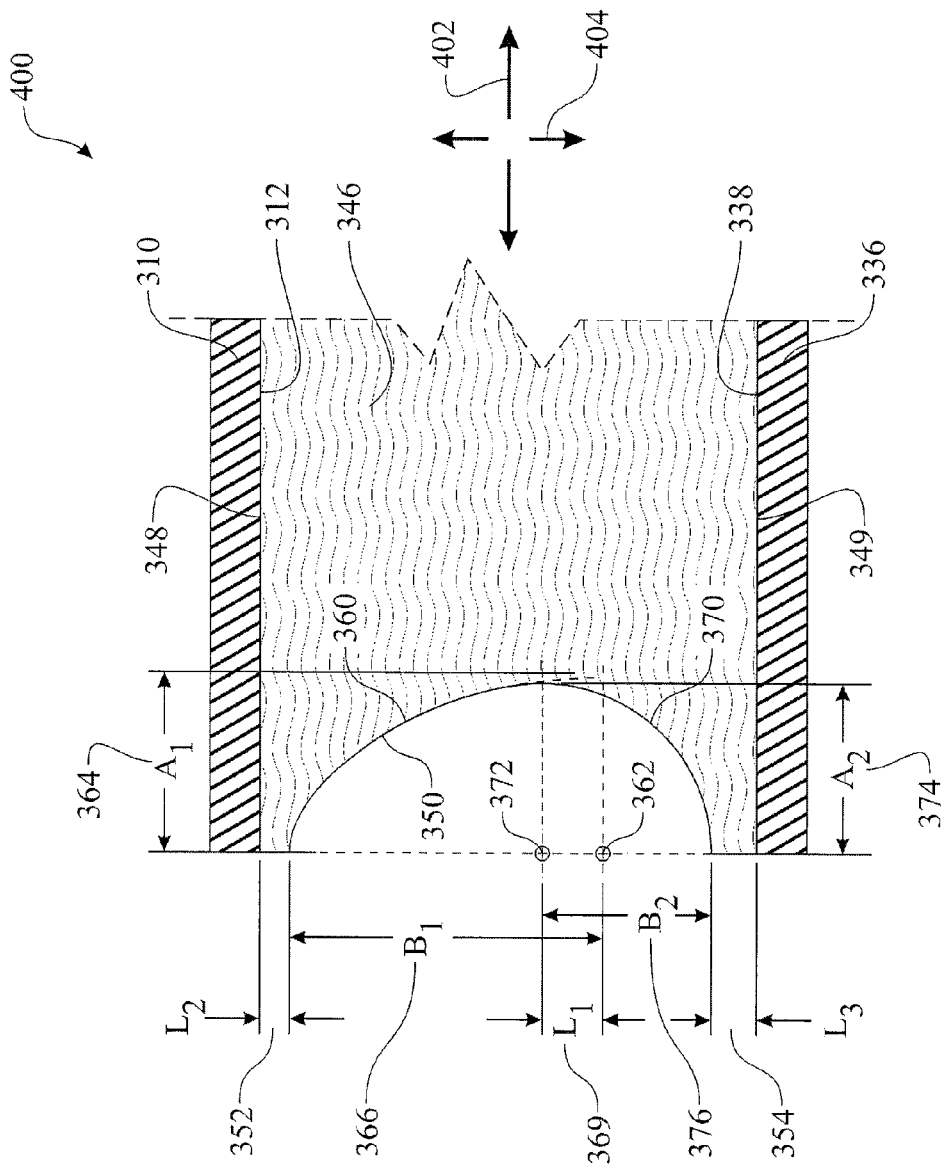
FIG. 5 presents a magnified elevation sectioned side view detailing a dual quarter ellipse peripheral edge configuration of the enhanced elastomer.
Figure 6:
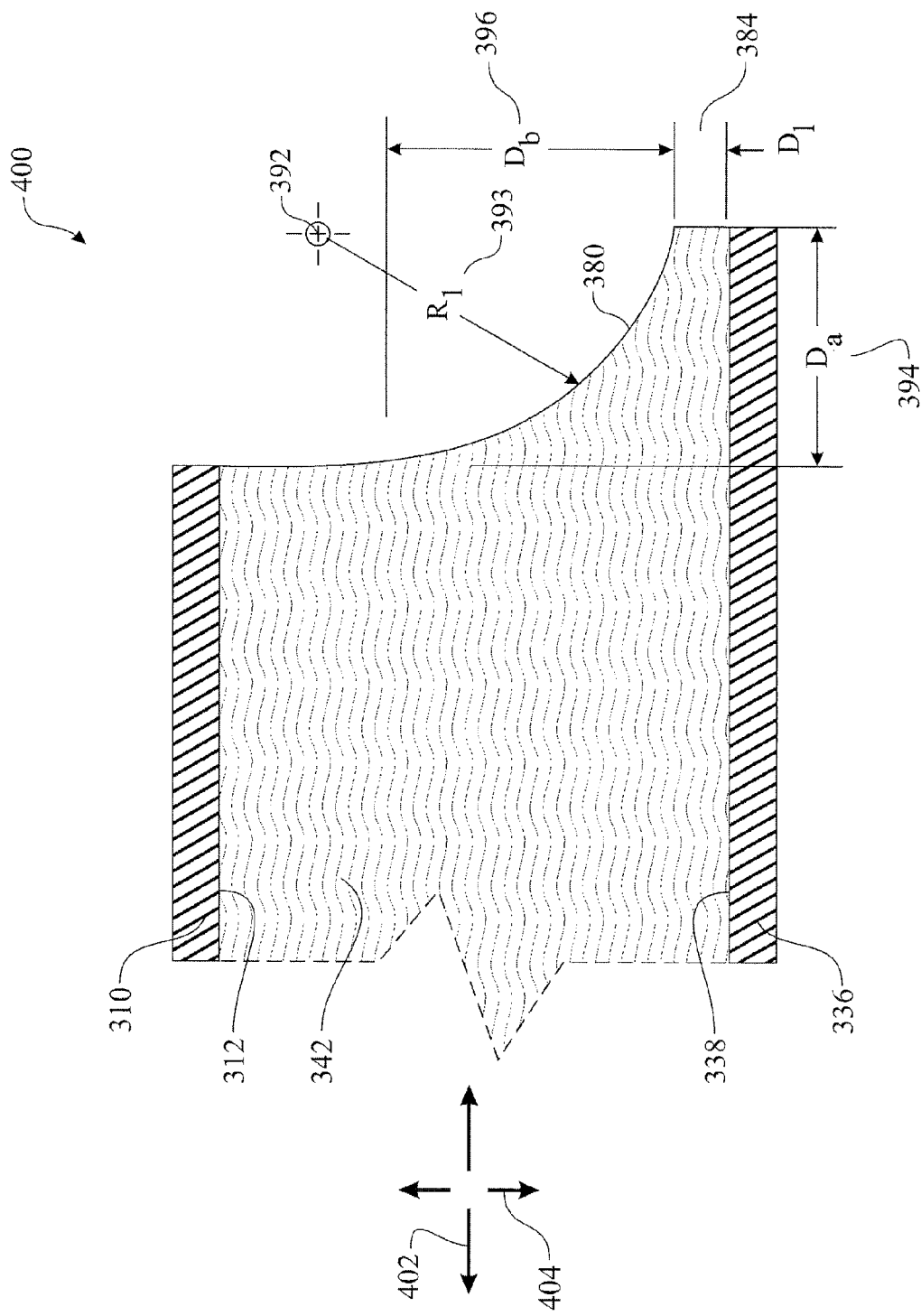
FIG. 6 presents a magnified elevation sectioned side view detailing a single quarter ellipse peripheral edge configuration of the enhanced elastomer.

A elastomeric damper 300, detailed in FIGS. 4 through 6, includes features to address the stresses and strain induced by the movements of a mounting rod force distribution member 330 respective to a first damper plate 310, a mounting rod force distribution member backbone plate 336, and a second damper plate 320. The elastomeric damper 300 includes a number of elements that are similar to those of the elastomeric damper 200. Like elements of the elastomeric damper 300 and the elastomeric damper 200 are numbered the same except preceded by the numeral '3'. The distinction between the elastomeric damper 200 and the elastomeric damper 300 is the inclusion of a dual quarter elliptical shaped first elastomer pinned end peripheral surface 350 extending between the contacting surface 338, 339 of the mounting rod force distribution member backbone plate 336 and the opposing damper plate elastomer contacting surface 312, 322, respectively. Each of the exposed edges, more specifically, the elastomer pinned end peripheral surface 350, 351 and the elastomer rod end peripheral segment surfaces 380, 381 are designed having a continuous arched surface extending substantially between a respective damper plate elastomer contacting surface 312, 322 and the respective force distribution plate elastomer contacting surfaces 338, 339.

Details of the arched surfaces (identified by the dark broken lined ovals) are illustrated as magnified elastomer end sections 400 presented in FIGS. 5 and 6. The figures present a section of an elastomeric member 340 sandwiched between a first damper plate 310 and a mounting rod force distribution member backbone plate 336, wherein the first damper plate 310 is representative of a first rigid plate and the mounting rod force distribution member backbone plate 336 is representative of a second rigid plate.

The figure presents geometric descriptions describing the first elastomer pinned end peripheral surface 350. It is understood that the second elastomer pinned end peripheral surface 351 is a mirror image of the first elastomer pinned end peripheral surface 350, wherein the second elastomer pinned end peripheral surface 351 is mirrored about a longitudinal centerline of the elastomeric member 340. The first elastomer pinned end peripheral surface 350 is designed having a dual quarter ellipse or a combination of two (2) quarter ellipses, a first elongated first quarter ellipse 360 and a shortened second quarter ellipse 370.

The first elongated first quarter ellipse 360 can be described by a longitudinal first quarter ellipse dimension (A1) 364 and a lateral first quarter ellipse dimension (B1) 366, each dimension being referenced from an elongated first quarter ellipse radial origin 362. The longitudinal first quarter ellipse dimension (A1) 364 defines a dimension of the first elongated first quarter ellipse 360 between the elongated first quarter ellipse radial origin 362 and a tangent edge of a quadrant node, wherein the quadrant node is located along a longitudinal axis extending parallel to a length of the elastomeric member 340 and passing through the associated elongated first quarter ellipse radial origin 362. The lateral first quarter ellipse dimension (B1) 366 defines a dimension of the first elongated first quarter ellipse 360 between the elongated first quarter ellipse radial origin 362 and a terminal node of the quarter ellipse 360 located along a distal edge of the elastomeric member 340 and proximate the first damper plate elastomer contacting surface 312.

The shortened second quarter ellipse 370 can be described by a longitudinal second quarter ellipse dimension (A3) 374 and a lateral second quarter ellipse dimension (B2) 376, each dimension being referenced from a shortened second quarter ellipse radial origin 372. The longitudinal second quarter ellipse dimension (A3) 374 defines a dimension of the shortened second quarter ellipse 370 between the shortened second quarter ellipse radial origin 372 and a tangent edge of a quadrant node, wherein the quadrant node is located along a longitudinal axis extending parallel to a length of the elastomeric member 340 and passing through the associated shortened second quarter ellipse radial origin 372. The lateral second quarter ellipse dimension (B2) 376 defines a dimension of the shortened second quarter ellipse 370 between the shortened second quarter ellipse radial origin 372 and a terminal node of the quarter ellipse 370 located along a distal edge of the elastomeric member 340 and proximate the force distribution plate first elastomer contacting surface 338. It is noted that the longitudinal first quarter ellipse dimension (A1) 364 may be longer or shorter than the lateral first quarter ellipse dimension (B1) 366.

The elongated first quarter ellipse radial origin 362 and the shortened second quarter ellipse radial origin 372 may be coincidental or separated by a first origin and second origin span (L1) 369. The intersecting node between each of the two (2) quarter ellipses 360, 370 would be smoothed to provide a continuous concave curved surface.

A short lateral edge can be integrated into the design at the distal end of each quarter ellipse 360, 370, wherein the short lateral edge extends between the terminal node of the respective quarter ellipse 360, 370 and the proximate elastomer rigid plate mating surface 348, 349 or the proximate rigid body contacting surface 312, 338. Each short lateral edge is identified by a length: a first elastomer edge thickness (L2) 352 extending between the terminal node of the quarter ellipse 360 and the first damper plate elastomer contacting surface 312 and a second elastomer edge thickness (L3) 354 extending between the terminal node of the quarter ellipse 370 and the force distribution plate first elastomer contacting surface 338. Each of the lengths L2 (352), L3 (354) of the short lateral edges can determine the location of the dual quarter ellipses 360, 370.

The elastomer rod end peripheral first segment surface 380 is a single quarter ellipse that can be described by an elongated first quarter ellipse radial origin 392 extending an ellipse radius (R1) 393 to define at least a portion of the arched surface of the elastomer rod end peripheral first segment surface 380, a longitudinal quarter ellipse dimension (Da) 394, and a lateral quarter ellipse dimension (Db) 396. The uniqueness of the specific geometry is that the ellipse radius (R1) 393 is greater than the lateral quarter ellipse dimension (Db) 396, which is greater than the longitudinal quarter ellipse dimension (Da) 394. In mathematic terms R1>Db≥Da.

Similar to the first elastomer pinned end peripheral surface 350, a short lateral edge can be integrated into the design at the distal end of the quarter ellipse 380, wherein the short lateral edge extends between the terminal node of the quarter ellipse 380 and the proximate contacting surface 338. The short lateral edge is identified by its length, wherein an elastomer edge thickness (Dl) 384 extends between the terminal node of the quarter ellipse 380 and the force distribution plate first elastomer contacting surface 338.

It is understood that the exemplary embodiments of the elastomeric member 340 can be incorporated into any of a variety of similar applications. The elastomeric member 340 can include:

A) an elastomer rod end peripheral first segment surface 380 at a first end and a first elastomer pinned end peripheral surface 350 at a second end;

B) an elastomer rod end peripheral first segment surface 380 at a first end and a similar elastomer rod end peripheral first segment surface 380 at a second end; or C) a first elastomer pinned end peripheral surface 350 at a first end and a similar first elastomer pinned end peripheral surface 350 at a second end.

The quarter ellipses 360, 370, 380 distribute any concentration of stresses induced within the elastomeric member 340, thus reducing tearing.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

LISTING OF REFERENCE NUMBERS

Ref. No. Description
100 helicopter rotor assembly section
110 helicopter rotor mast
112 helicopter rotor Jesus nut
114 rotor hub
120 helicopter blade
130 helicopter blade assembly blade grip
132 helicopter blade retention element
140 fixed damper mounting pin
142 axial damper mounting rod
144 axial damper mounting rod coupling pin
200 elastomeric damper
210 first damper plate
212 first damper plate elastomer contacting surface
214 first plate fixed damper mounting pin receiving aperture
216 cylindrical passageway
218 cylindrical passageway
220 second damper plate
222 second damper plate elastomer contacting surface
224 second plate fixed damper mounting pin receiving aperture
230 mounting rod force distribution member
232 mounting rod coupling section
234 mounting rod coupling threaded receptacle
236 mounting rod force distribution member backbone plate
238 force distribution plate first elastomer contacting surface
239 force distribution plate second elastomer contacting surface
240 elastomeric member
242 elastomer rod end first segment
243 elastomer rod end second segment
244 elastomer central first segment
245 elastomer central second segment
246 elastomer pinned end first segment
247 elastomer pinned end second segment
248 first elastomer rigid plate mating surface
249 second elastomer rigid plate mating surface
250 elastomer pinned end peripheral surface
280 elastomer rod end peripheral first segment surface
281 elastomer rod end peripheral second segment surface
300 elastomeric damper
310 first damper plate
312 first damper plate elastomer contacting surface
314 first plate fixed damper mounting pin receiving aperture
320 second damper plate
322 second damper plate elastomer contacting surface
324 second plate fixed damper mounting pin receiving aperture
330 mounting rod force distribution member
332 mounting rod coupling section
334 mounting rod coupling threaded receptacle
336 mounting rod force distribution member backbone plate
338 force distribution plate first elastomer contacting surface
339 force distribution plate second elastomer contacting surface
340 elastomeric member
342 elastomer rod end first segment
343 elastomer rod end second segment
344 elastomer central first segment
345 elastomer central second segment
346 elastomer pinned end first segment
347 elastomer pinned end second segment
348 first damper plate engaging surface
349 second damper plate engaging surface
350 first elastomer pinned end peripheral surface
351 second elastomer pinned end peripheral surface
352 first elastomer edge thickness (L)
354 second elastomer edge thickness (L)
360 first elongated first quarter ellipse 362 elongated first quarter ellipse radial origin
364 longitudinal first quarter ellipse dimension (A)
366 lateral first quarter ellipse dimension (B)
369 first origin and second origin span (L)
370 shortened second quarter ellipse
372 shortened second quarter ellipse radial origin
374 longitudinal second quarter ellipse dimension (A)
376 lateral second quarter ellipse dimension (B)
380 elastomer rod end peripheral first segment surface
381 elastomer rod end peripheral second segment surface
384 elastomer edge thickness (D1)
392 elongated first quarter ellipse radial origin
393 ellipse radius (R)
394 longitudinal quarter ellipse dimension (Da)
396 lateral quarter ellipse dimension (Db)
400 magnified elastomer end section
402 shear direction
404 compression/tension direction

What is claimed is:

1. An elastomer damper comprising:
a first damper rigid plate having a first damper rigid plate elastomer contacting surface and;
a second damper rigid plate being oriented generally parallel to the first damper rigid plate and having a second damper rigid plate elastomer contacting surface; and
an elastomer element having a first damper rigid plate engaging surface, an opposite second damper rigid plate engaging surface and a peripheral surface extending between a circumferential edge of the first damper rigid plate engaging surface and a circumferential edge of the second damper rigid plate engaging surface, wherein at least a section of the peripheral surface is formed comprising a concave arch formed comprising a quarter ellipse, said elastomer element having longitudinal direction defined as being parallel to said damper rigid plate engaging surfaces and a lateral direction defined as being generally perpendicular to said longitudinal direction extending between said damper rigid plate engaging surfaces;
wherein the elastomer is assembled mating the first damper rigid plate engaging surface with a surface of the first damper rigid plate and the opposite second damper rigid plate engaging surface with a surface of the second damper rigid plate.

2. The elastomer damper as recited in claim 1, wherein said quarter ellipse extends between said first damper rigid plate engaging surface and said second damper rigid plate engaging surface.

3. The elastomer damper as recited in claim 1, wherein said quarter ellipse extends between substantially said first damper rigid plate engaging surface and said second damper rigid plate engaging surface, said peripheral surface further comprising a first short lateral edge extending between a first end of said quarter ellipse and said first damper rigid plate engaging surface and a second short lateral edge extending between a second end of said quarter ellipse and said second damper rigid plate engaging surface.

4. The elastomer damper as recited in claim 1, wherein said quarter ellipse is defined having a lateral quarter ellipse dimension measured laterally between a first quadrant node of said quarter ellipse and a second quadrant node of said quarter ellipse and a longitudinal quarter ellipse dimension measured longitudinally between said first quadrant node of said quarter ellipse and said second quadrant node of said quarter ellipse, wherein said lateral quarter ellipse dimension and said longitudinal quarter ellipse dimension are dissimilar to one another.

5. The elastomer damper as recited in claim 1, wherein said quarter ellipse is defined having a lateral quarter ellipse dimension measured laterally between a first quadrant node of said quarter ellipse and a second quadrant node of said quarter ellipse and a longitudinal quarter ellipse dimension measured longitudinally between said first quadrant node of said quarter ellipse and said second quadrant node of said quarter ellipse, wherein said lateral quarter ellipse dimension is greater than said longitudinal quarter ellipse dimension.

6. The elastomer damper as recited in claim 1, wherein said quarter ellipse is defined having a lateral quarter ellipse dimension measured laterally between a first quadrant node of said quarter ellipse and a second quadrant node of said quarter ellipse and a longitudinal quarter ellipse dimension measured longitudinally between said first quadrant node of said quarter ellipse and said second quadrant node of said quarter ellipse, wherein said lateral quarter ellipse dimension is less than said longitudinal quarter ellipse dimension.

7. An elastomer damper comprising:
a first damper rigid plate having a first damper rigid plate elastomer contacting surface and;
a second damper rigid plate being oriented generally parallel to the first damper rigid plate; and
an elastomer element having a first damper rigid plate engaging surface, an opposite second damper rigid plate engaging surface and a peripheral surface extending between a circumferential edge of the first damper rigid plate engaging surface and a circumferential edge of the second damper rigid plate engaging surface, wherein at least a section of the peripheral surface is formed comprising a dual quarter ellipse, said elastomer element having longitudinal direction defined as being parallel to said damper rigid plate engaging surfaces and a lateral direction defined as being generally perpendicular to said longitudinal direction extending between said damper rigid plate engaging surfaces, said dual quarter ellipsoid formed by combining a first elongated first quarter ellipse and a second elongated first quarter ellipse in a continuous concave arched shape;
wherein the elastomer is assembled mating the first damper rigid plate engaging surface with a surface of the first damper rigid plate and the opposite second damper rigid plate engaging surface with a surface of the second damper rigid plate.

8. The elastomer damper as recited in claim 7, wherein said dual quarter ellipse extends between said first damper rigid plate engaging surface and said second damper rigid plate engaging surface.

9. The elastomer damper as recited in claim 7, wherein said dual quarter ellipse extends between substantially said first damper rigid plate engaging surface and said second damper rigid plate engaging surface, said peripheral surface further comprising a first short lateral edge extending between a first end of said dual quarter ellipse and said first damper rigid plate engaging surface and a second short lateral edge extending between a second end of said dual quarter ellipse and said second damper rigid plate engaging surface.

10. The elastomer damper as recited in claim 7, wherein said first quarter ellipse is defined by a first quarter ellipse radial origin,
wherein said second quarter ellipse is defined by a second quarter ellipse radial origin,
wherein said first quarter ellipse radial origin and said second quarter ellipse radial origin are coincidental with one another.

11. The elastomer damper as recited in claim 7, wherein said first quarter ellipse is defined by a first quarter ellipse radial origin,
  wherein said second quarter ellipse is defined by a second quarter ellipse radial origin,
  wherein said first quarter ellipse radial origin and said second quarter ellipse radial origin are separated by a first origin and second origin span.

12. The elastomer damper as recited in claim 7, wherein said first quarter ellipse is defined having a lateral first quarter ellipse dimension measured laterally between a first quadrant node of said first quarter ellipse and a second quadrant node of said first quarter ellipse and a longitudinal first quarter ellipse dimension measured longitudinally between said first quadrant node of said first quarter ellipse and said second quadrant node of said first quarter ellipse,
  wherein said second quarter ellipse is defined having a lateral second quarter ellipse dimension measured laterally between a first quadrant node of said second quarter ellipse and a second quadrant node of said second quarter ellipse and a longitudinal second quarter ellipse dimension measured longitudinally between said first quadrant node of said second quarter ellipse and said second quadrant node of said second quarter ellipse,
  wherein said lateral first quarter ellipse dimension and said lateral second quarter ellipse dimension are dissimilar to one another.

13. The elastomer damper as recited in claim 12, wherein said first quarter ellipse is defined by a first quarter ellipse radial origin,
  wherein said second quarter ellipse is defined by a second quarter ellipse radial origin,
  wherein said first quarter ellipse radial origin and said second quarter ellipse radial origin are separated by a first origin and second origin span.

14. The elastomer damper as recited in claim 7, wherein said first quarter ellipse is defined having a lateral first quarter ellipse dimension measured laterally between a first quadrant node of said first quarter ellipse and a second quadrant node of said first quarter ellipse and a longitudinal first quarter ellipse dimension measured longitudinally between said first quadrant node of said first quarter ellipse and said second quadrant node of said first quarter ellipse, wherein said lateral first quarter ellipse dimension and said longitudinal first quarter ellipse dimension are dissimilar to one another,
  wherein said second quarter ellipse is defined having a lateral second quarter ellipse dimension measured laterally between a first quadrant node of said second quarter ellipse and a second quadrant node of said second quarter ellipse and a longitudinal second quarter ellipse dimension measured longitudinally between said first quadrant node of said second quarter ellipse and said second quadrant node of said second quarter ellipse, wherein said lateral second quarter ellipse dimension and said longitudinal second quarter ellipse dimension are dissimilar to one another.

15. The elastomer damper as recited in claim 14, wherein said first quarter ellipse is defined by a first quarter ellipse radial origin,
  wherein said second quarter ellipse is defined by a second quarter ellipse radial origin,
  wherein said first quarter ellipse radial origin and said second quarter ellipse radial origin are separated by a first origin and second origin span.

16. An elastomer damper comprising:
  a first damper rigid plate having a first damper rigid plate elastomer contacting surface and;
  a second damper rigid plate being oriented generally parallel to the first damper rigid plate and having a second damper rigid plate elastomer contacting surface; and
  an elastomer element having a first damper rigid plate engaging surface, an opposite second damper rigid plate engaging surface and a peripheral surface extending between a circumferential edge of the first damper rigid plate engaging surface and a circumferential edge of the second damper rigid plate engaging surface, wherein a first section of the peripheral surface is formed comprising a first concave arch formed comprising a quarter ellipse shape, said elastomer element having longitudinal direction defined as being parallel to said damper rigid plate engaging surfaces and a lateral direction defined as being generally perpendicular to said longitudinal direction extending between said damper rigid plate engaging surfaces, and wherein a second section of the peripheral surface is formed comprising a dual quarter ellipse shape, said dual quarter ellipsoid formed by combining a first elongated first quarter ellipse and a second elongated first quarter ellipse in a continuous second concave arched shape;
  wherein the elastomer is assembled mating the first damper rigid plate engaging surface with a surface of the first damper rigid plate and the opposite second damper rigid plate engaging surface with a surface of the second damper rigid plate.

17. The elastomer damper as recited in claim 16, wherein said quarter ellipse of said first concave arch extends between said first damper rigid plate engaging surface and said second damper rigid plate engaging surface, and
  wherein said dual quarter ellipse of said continuous second concave arched shape extends between said first damper rigid plate engaging surface and said second damper rigid plate engaging surface.

18. The elastomer damper as recited in claim 16, wherein said first concave arch extends between substantially said first damper rigid plate engaging surface and said second damper rigid plate engaging surface, said peripheral surface further comprising a first short lateral edge extending between a first end of said first concave arch and said first damper rigid plate engaging surface and a second short lateral edge extending between a second end of said first concave arch and said second damper rigid plate engaging surface, and
  wherein said continuous second concave arched shape extends between substantially said first damper rigid plate engaging surface and said second damper rigid plate engaging surface, said peripheral surface further comprising a first short lateral edge extending between a first end of said continuous second concave arched shape and said first damper rigid plate engaging surface and a second short lateral edge extending between a second end of said continuous second concave arched shape and said second damper rigid plate engaging surface.

19. The elastomer damper as recited in claim 16, wherein said first concave arch is defined having a lateral quarter ellipse dimension measured laterally between a first quadrant node of said quarter ellipse and a second quadrant node of said quarter ellipse and a longitudinal quarter ellipse dimension measured longitudinally between said first quadrant node of said quarter ellipse and said second quadrant node of said quarter ellipse, wherein said lateral quarter ellipse dimension and said longitudinal quarter ellipse dimension are dissimilar to one another.

20. The elastomer damper as recited in claim 16, wherein said first quarter ellipse is defined having a lateral first quarter ellipse dimension measured laterally between a first quadrant node of said first quarter ellipse and a second quadrant node of said first quarter ellipse and a longitudinal first quarter ellipse dimension measured longitudinally between said first quadrant node of said first quarter ellipse and said second quadrant node of said first quarter ellipse,
    wherein said second quarter ellipse is defined having a lateral second quarter ellipse dimension measured laterally between a first quadrant node of said second quarter ellipse and a second quadrant node of said second quarter ellipse and a longitudinal second quarter ellipse dimension measured longitudinally between said first quadrant node of said second quarter ellipse and said second quadrant node of said second quarter ellipse,
    wherein said lateral first quarter ellipse dimension and said lateral second quarter ellipse dimension are dissimilar to one another.

\* \* \* \* \*